United States Patent [19]
Clayton

[11] 4,160,053
[45] Jul. 3, 1979

[54] BLOCKED FILM LAMINATE OF LOW DENSITY POLYETHYLENE

[75] Inventor: William J. Clayton, Fairport, N.Y.

[73] Assignee: Mobil Oil Corporation, New York, N.Y.

[21] Appl. No.: 852,407

[22] Filed: Nov. 17, 1977

Related U.S. Application Data

[63] Continuation-in-part of Ser. No. 651,675, Jan. 23, 1976, abandoned.

[51] Int. Cl.$^2$ .................................................. B65D 31/00
[52] U.S. Cl. ................................... 428/35; 428/323; 428/409; 428/516; 428/517; 229/53; 156/229
[58] Field of Search ................ 428/409, 517, 516, 35, 428/323; 229/910, 53; 260/876 B, 878 B

[56] References Cited

U.S. PATENT DOCUMENTS

| | | | |
|---|---|---|---|
| 3,058,863 | 10/1962 | Gaines et al. | 428/517 |
| 3,361,607 | 1/1968 | Bruno | 428/517 |
| 3,509,005 | 4/1970 | Hartig | 428/35 |
| 3,554,833 | 1/1971 | Devries et al. | 156/229 |
| 3,582,418 | 6/1971 | Schuur | 156/229 |
| 3,950,206 | 4/1976 | Adachi | 428/409 |

*Primary Examiner*—P. C. Ives
*Attorney, Agent, or Firm*—Charles A. Huggett; Hastings S. Trigg

[57] ABSTRACT

Laminates of two or more low density polyethylene films are prepared by blocking together superimposed films at a temperature below the fusion temperature, whereby the films can be pealed apart without distortion. The laminates are adapted for the manufacture of heavy duty bags and sacks having increased impact and tear resistance, as compared with single films or fused together laminates having the same gauge.

6 Claims, 1 Drawing Figure

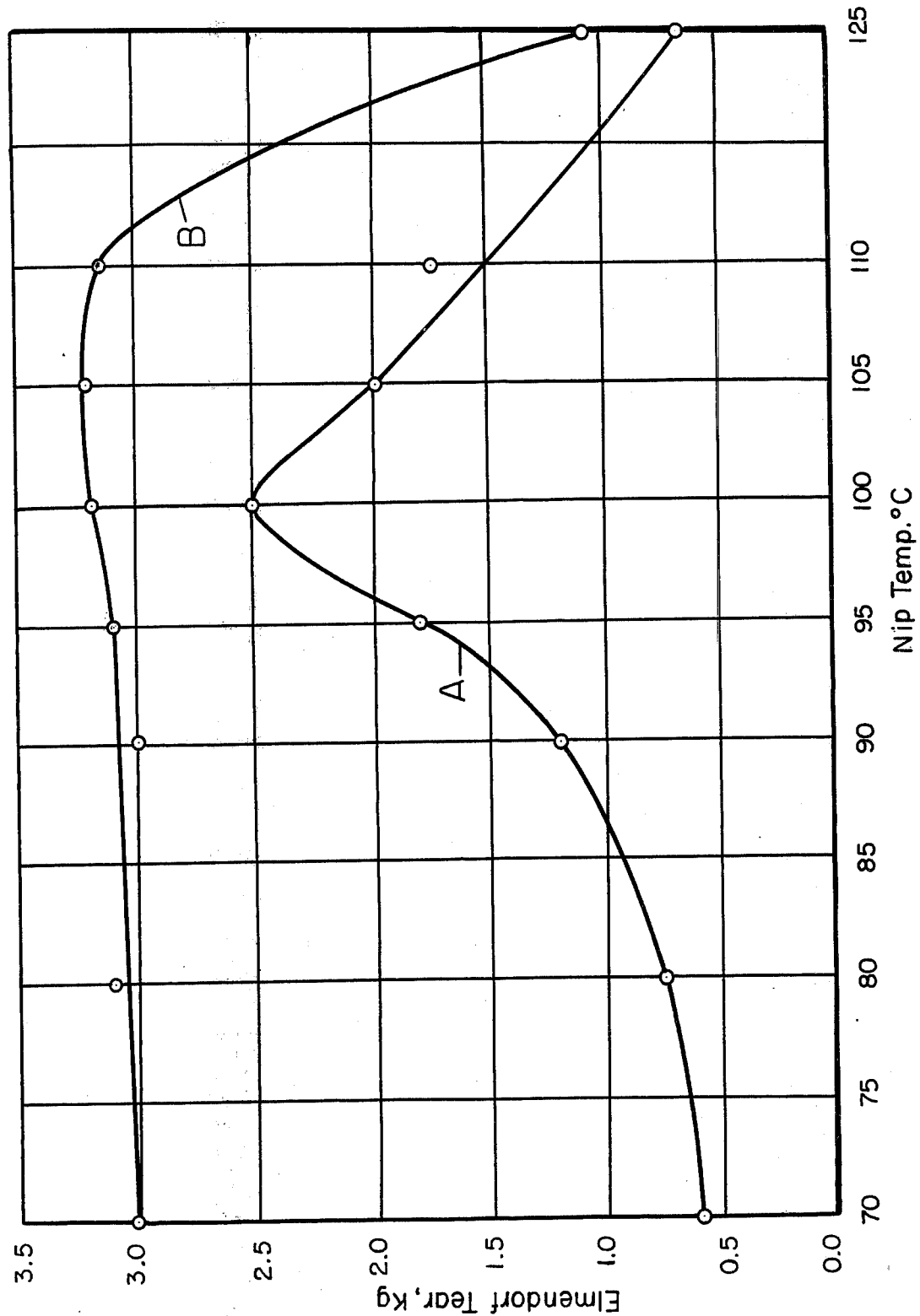

BLOCKED FILM LAMINATE OF LOW DENSITY POLYETHYLENE

CROSS-REFERENCE TO RELATED APPLICATION

This application is a continuation-in-part of copending application Ser. No. 651,675, filed Jan. 23, 1976 now abandoned.

BACKGROUND OF THE INVENTION

1. Field of the Invention

This invention relates to blocked laminates of low density polyethylene films, the method of making them, and bags and sacks made therefrom.

2. Description of the Prior Art

In U.S. Pat. No. 3,554,833, there is described a laminate prepared by extruding a tube of thermoplastic material and flattening it between a pair of nip rolls, while the tube is still in a heat-softened, semi-molten condition whereby the walls of the tube fuse together to form a flat two-layer film laminate. Such laminate has been found to have significantly lower tear and impact resistance than the blocked laminates of this invention.

SUMMARY OF THE INVENTION

This invention provides a laminate of two or more low density polyethylene films blocked together at a temperature between about 80° C. and about 100° C. and below the fusion temperature of the polyethylene.

It also provides the method of making said laminate that comprises placing two or more low density polyethylene films in a superimposed, contacting relationship and heating, at a temperature of between about 80° C. and about 100° C. and below the fusion temperature of the polyethylene.

It further provides heavy duty bags and sacks made from said laminate.

DESCRIPTION OF THE DRAWING

The FIGURE presents two curves showing the relationship between the nip temperature and Elmendorf Tear resistance in the machine direction and in the transverse direction of two-layer low density polyethylene film laminates formed at temperatures including blocking temperatures and fusion temperatures.

DESCRIPTION OF SPECIFIC EMBODIMENTS

The thermoplastic material from which the film laminates of this invention are made is low density polyethylene (LDPE) having a density of 0.915 to 0.925 and a melt index (M.I.) of 0.2 to 0.26. Although any LDPE films are applicable to making laminates in accordance with this invention, it is preferred to use films of 2 to 3 mils gauge. One mil films would be more prone to be affected by film imperfections and 5 mil films are more difficult to heat and cool.

The laminates of this invention are prepared by placing at least two LDPE films in a superimposed and contacting engagement and heating at a temperature below the fusion temperature of LDPE. Heating can be effected by any means known in the art. Preferably, lamination is effected by passing the superimposed films through the nip of a pair of engaging heated rollers.

In order to obtain good tear resistance properties in both the machine direction (MD) and the transverse direction (TD) of the laminate, the degree of blocking is extremely important. This is a function of the temperature at the nip. At temperatures below fusion, i.e., at 100° C. or lower, blocking occurs, but the films of the laminate can be peeled apart without distortion. Above 100° C., fusion occurs and the films are heat sealed or bonded and cannot be peeled apart. The following example demonstrates this important consideration.

EXAMPLE 1

A series of laminates was prepared each consisting of 2 layers of 2.5 mils LDPE film. The LDPE had a density of 0.918 and a M.I. of 0.24 and had incorporated therein 3 weight percent $TiO_2$ pigment. Each laminate was prepared at a different temperature by passing the 2 film layer through the nip of a pair of rollers. One roller was made of steel and internally heated with circulated oil and the other was a rubber coated roller externally heated with a radiant heater. The external heater was adjusted so that the temperature of the rubber coated roller was almost identical to the temperature of the oil heated roller. Thus, the nip temperature was taken to be the same as the oil temperature in the oil heated roller.

For each laminate, the degree of blocking was measured by the peel separation of 3 in. wide strips delaminated 1 in. at the top in an Instron machine with a jaw separation of 20 in./min. The values are expressed in terms of ft./lb. per 100 square inches of separation. The Elmendorf tear test is described in ASTM Designation D-1922-67 (1972). Pertinent data are set forth in Table I.

TABLE I

| Film Tested | Temp. of Nip C° | Degree of Blocking Ft./lb/100 Sq.In. | Elmendorf Tear (in Kilograms) | |
|---|---|---|---|---|
| | | | MD | TD |
| Laminate (2.5 + 2.5 mil) | 70 | — | 0.6 | 3.0 |
| | 80 | — | 0.75 | 3.1 |
| | 85 | 0.12 | | |
| | 90 | 0.29 | 1.2 | 3.0 |
| | 95 | 1.0 | 1.8 | 3.1 |
| | 100 | 8.9 | 2.5 | 3.2 |
| | 105 | Fused | 2.0 | 3.2 |
| | 110 | " | 1.75 | 3.2 |
| | 125 | " | 0.7 | 1.1 |
| Single Layer of 5 mil film | | | 0.6 | 0.9 |

The curves in the FIGURE are based upon the data in Table I and show the graphic relationship between tear resistance and the nip temperature. Curve A shows the relationship in the MD and Curve B in the TD.

From the data in Table I and the FIGURE, it will be noted that at lower temperatures (70° and 80° C.) there is little blocking and the MD tear is low, although TD tear is high. At 85° C. there is a measurable blocking. At 100° C. the amount of blocking force increases and maximum MD tear is reached, as well as maximum TD tear. The lamina, however, are still peelable. At temperatures above 100° C., fusion commences to occur and MD tear drops. At 125° C., the laminates are completely fused and both MD and TD tear are low. Accordingly, to achieve good tear resistance in both MD and TD, the films in the laminate should be blocked together at temperatures generally between about 80° C. and about 100° C. and preferably at about 100° C. It will be noted that laminates so made have MD and TD tear resistance in the order of 2–4 times that of a single film of the same overall gauge (5 mils).

The films used to make the laminates in accordance with this invention can be clear or pigmented. In either case improved properties are achieved over those of a single film of the same overall gauge or of a fused laminate. Any of the usual pigments well known in the art can be used.

Another important factor for films used in heavy duty bag manufacture is the impact resistance. This is measured as the minimum height from which a polished steel ball of 1.5 in. diameter, weighing 681 g., will fracture a film sample, when dropped onto the film held firmly with a ring clamp. Because of some variations in film thickness results are given in inches of drop and in inches per mil.

EXAMPLE 2

Four LDPE films having the same nominal thickness of 5 mils were tested for impact resistance. They include a single layer of 5 mil film compared with a 2.5+2.5 mil two-ply blocked laminate in both clear and white (3% $TiO_2$). All films were made from the same batch of LDPE used in Example 1. Pertinent data in duplicate test series for each film are set forth in Table II.

TABLE II

| Film | Actual gauge, mils | Ball drop, inches | Ball drop, inches/mil |
|---|---|---|---|
| Clear 5.0 mil | 4.8 | 30 | 6.25 |
| 1 layer | 5.0 | 32 | 6.4 |
| Clear 5.0 mil | 5.1 | 45 | 8.8 |
| (2.5+2.5) laminate | 5.2 | 46 | 8.8 |
| White 5.0 mil | 4.8 | 35 | 7.3 |
| 1 layer | 4.6 | 34 | 7.4 |
| White 5.0 mil | 5.3 | 55 | 10.4 |
| (2.5+2.5) laminate | 4.8 | 48 | 10.0 |

In order to compare films on an even basis and to allow for gauge variations, the test results are compared with regard to inches of drop per mil. On this basis, from the data in Table II, it will be noted that the improvement in impact resistance of laminate over single film is 40% for clear (8.8 vs. 6.3) and 34% for pigmented (10.2 vs. 7.3).

As has been indicated hereinbefore, the block lamination can be effected in several ways. Multiple layers of film can be passed between heated rollers, as in Example 1. A feasible method involves the use of a flattened tube of LDPE. A tube is extruded, inflated, and cooled. Then the tube is flattened and passed through the nip of a pair of rollers heated to the desired temperature to effect blocking. In another method, generally on a small scale, the laminate is pressed between the heated platens of a press.

The relative direction of the orientation of the films in the laminates of this invention has an effect on the amount of improvement (over single film) in MD tear resistance. When two or more layers of film with the grain of all the films oriented to run in the same direction, the improvement in MD tear is small and the improvement in TD tear is about double. When two or more layers of film are laminated with the MD grain of one film running at 45° to the grain of another, the improvement in both MD tear and TD tear is at least triple. The grain in a layflat tube is largely MD, but one side usually slopes to the right and the other to the left. Thus, there is some crossing of the grain and the improvement in tear is usually double. A preferred method is to use a tube formed using a rotating die so that the grain will run either 15° to the right of MD or 15° to the left of MD, i.e., at ±15° orientation.

EXAMPLE 3

A series of two layer laminates were prepared from extruded tubes of the LDPE described in Example 1. The tubes had a wall thickness of 2.5 mils. Thus, when the tube was flattened, there was formed a 5 mil laminate. Various methods were used to block the films together. Pertinent data are set forth in Table III. Data for a single 5 mil film are included for comparison.

TABLE III

| Sample No. | Film | Interface During Lamination, °F. | Gauge | Ball Drop (inches) | Elmendorf Tear (kg.) MD | Elmendorf Tear (kg.) TD |
|---|---|---|---|---|---|---|
| 1 | Single Layer | | 5.0 | 35 | 0.55 | 0.76 |
| 2 | 2.5+2.5 mil Extruder Nips | 180 | 5.0 | 52 | 0.67 | 2.75 |
| 3 | 2.5+2.5 mil Roll Sealer | 210 | 5.0 | 45 | 2.45 | — |
| 4 | 2.5+2.5 mil Press | 180 | 5.0 | 52 | 1.28 | 3.2 |
| 5 | 2.5+2.5 mil Press | 200 | 5.0 | 52 | 2.18 | 3.2 |
| 6 | 2.5+2.5 mil Press ± 15° Orientation | 180 | 5.0 | 65 | 2.56 | 2.92 |
| 7 | 2.5+2.5 mil Press± 15° Orientation | 200 | 5.0 | 65 | 1.86 | 3.2 |
| 8 | 2.5+2.5 mil Roll Sealer | 180 | 5.0 | — | 2.4 | 2.7 |

Although the present invention has been described with preferred embodiments, it is to understood that modifications and variations may be resorted to, without departing from the spirit and scope of this invention, as those in the art will readily understand. Such modifications and variations are considered to be within the purview and scope of the appended claims.

What is claimed is:

1. A laminate of at least two low density polyethylene films blocked together at a temperature between about 80° C. and 100° C. and below the fusion temperature of the polyethylene.

2. The laminate of claim 1 wherein said films are pigmented.

3. The laminate of claim 1 wherein said films are in ±15° orientation.

4. Heavy duty bags and sacks made from the laminate of claim 1.

5. Heavy duty bags and sacks made from the laminate of claim 2.

6. Heavy duty bags and sacks made from the laminate of claim 3.

* * * * *